(12) United States Patent
Tan et al.

(10) Patent No.: US 12,451,120 B2
(45) Date of Patent: Oct. 21, 2025

(54) SPEECH SYNTHESIS AND SPEECH RECOGNITION

(71) Applicant: Microsoft Technology Licensing, LLC, Redmond, WA (US)

(72) Inventors: Xu Tan, Redmond, WA (US); Tao Qin, Beijing (CN); Junwei Gan, Redmond, WA (US); Sheng Zhao, Redmond, WA (US); Tieyan Liu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 17/927,865

(22) PCT Filed: May 13, 2021

(86) PCT No.: PCT/US2021/032128
§ 371 (c)(1),
(2) Date: Nov. 25, 2022

(87) PCT Pub. No.: WO2022/005625
PCT Pub. Date: Jan. 6, 2022

(65) Prior Publication Data
US 2023/0298567 A1    Sep. 21, 2023

(30) Foreign Application Priority Data
Jun. 30, 2020 (CN) .......................... 202010620533.5

(51) Int. Cl.
G10L 15/00 (2013.01)
G10L 13/04 (2013.01)
G10L 15/06 (2013.01)

(52) U.S. Cl.
CPC ............ *G10L 15/063* (2013.01); *G10L 13/04* (2013.01)

(58) Field of Classification Search
CPC ....... G10L 15/063; G10L 13/00; G10L 13/02; G10L 13/08; G10L 13/04; G10L 21/013;
(Continued)

(56) References Cited

U.S. PATENT DOCUMENTS

2017/0092258 A1    3/2017  Edrenkin
2018/0254034 A1*   9/2018  Li .......................... G10L 15/063
(Continued)

FOREIGN PATENT DOCUMENTS

CN    102360543 A    3/2013
CN    109117483 A    1/2019
(Continued)

OTHER PUBLICATIONS

Baskar, et al., "Self-supervised sequence-to-sequence ASR using unpaired speech and text", arXiv preprint arXiv:1905.01152, 2019, 6 pages.
(Continued)

*Primary Examiner* — Michael Ortiz-Sanchez
(74) *Attorney, Agent, or Firm* — Schwegman Lundberg & Woessner, P.A.

(57) ABSTRACT

Implementations of the subject matter described herein provide a solution for speech synthesis and speech recognition. In this solution, a Text to Speech (TTS) model and an Automatic Speech Recognition (ASR) model supporting at least one language are obtained. The TTS model and the ASR model are adjusted, based on a first set of paired data in a target language, to support the target language. The TTS model is optimized based on the first set of paired data and a first set of synthesized paired data in the target language generated by the ASR model while the ASR model is optimized based on the first set of paired data and a second set of synthesized paired data in the target language generated by the TTS model. As such, the solution can provide
(Continued)

TTS and ASR models with high accuracy for languages lacking training data by using less training data.

13 Claims, 7 Drawing Sheets

(58) Field of Classification Search
CPC ..... G10L 21/057; G06F 40/44; G06N 3/0464; G06N 3/08; G06N 3/0455; G06N 20/00
See application file for complete search history.

(56) References Cited

U.S. PATENT DOCUMENTS

| | | | |
|---|---|---|---|
| 2020/0082806 A1* | 3/2020 | Kim | G06N 3/04 |
| 2020/0152184 A1 | 5/2020 | Steedman Henderson | |
| 2021/0304769 A1* | 9/2021 | Ye | G10L 15/065 |
| 2021/0312906 A1* | 10/2021 | Kuo | G10L 15/1822 |

FOREIGN PATENT DOCUMENTS

| | | |
|---|---|---|
| CN | 110428818 A | 11/2019 |
| KR | 20200048620 A | 5/2020 |
| WO | 2019139428 A1 | 7/2019 |

OTHER PUBLICATIONS

Communication pursuant to Article 94(3) Received in European Patent Application No. 21731622.3, mailed on Jun. 24, 2024, 6 pages.
Nakayama, et al., "Zero-Shot Code-Switching ASR and TTS with Multilingual Machine Speech Chain", IEEE Automatic Speech Recognition and Understanding Workshop (ASRU), Dec. 18, 2019, pp. 964-971.
Ren, et al., "Almost Unsupervised Text to Speech and Automatic Speech Recognition", Proceedings of Machine Learning Research, 2019, pp. 5410-5419.
"Open Source Database—Open Source Data Products", Retrieved From: https://web.archive.org/web/20200502011204/https://www.data-baker.com/open_source.html, May 2, 2020, 2 Pages.
Artetxe, et al., "On the Cross-lingual Transferability of Monolingual Representations", In Repository of arXiv:1910.11856v1, Oct. 25, 2019, 15 Pages.
Baevski, et al., "Effectiveness of Self-supervised Pre-training for Speech Recognition", In Repository of arXiv:1911.03912v1, Nov. 10, 2019, 10 Pages.
Bahdanau, et al., "Neural Machine Translation by Jointly Learning to Align and Translate", In Repository of arXiv:1409.0473v1, Sep. 1, 2014, 15 Pages.
Bruguier, et al., "Dictionary Augmented Sequence-to-Sequence Neural Network for Grapheme to Phoneme prediction", In Proceedings of 19th Annual Conference of the International Speech Communication Association, Sep. 2, 2018, pp. 3733-3737.
Bu, et al., "AISHELL-1: An Open-Source Mandarin Speech Corpus and a Speech Recognition Baseline", In Proceedings of 20th Conference of the Oriental Chapter of the International Coordinating Committee on Speech Databases and Speech I/O Systems and Assessment, Nov. 1, 2017, pp. 58-62.
Chan, et al., "Listen, Attend and Spell: A Neural Network for Large Vocabulary Conversational Speech Recognition", In Proceedings of International Conference on Acoustics, Speech and Signal Processing, Mar. 20, 2016, pp. 4960-4964.
Chen, et al., "End-to-end Text-to-speech for Low-resource Languages by Cross-Lingual Transfer Learning", In Proceedings of 20th Annual Conference of the International Speech Communication Association, Sep. 15, 2019, pp. 2075-2079.
Chen, et al., "Extensible Cross-Modal Hashing", In Proceedings of the Twenty-Eighth International Joint Conference on Artificial Intelligence, Aug. 10, 2019, pp. 2109-2115.
Chen, et al., "Towards Unsupervised Automatic Speech Recognition Trained by Unaligned Speech and Text Only", In Repository of arXiv:1803.10952v1, Mar. 29, 2018, 5 Pages.
Chiu, et al., "State-of-the-Art Speech Recognition with Sequence-to-Sequence Models", In Proceedings of IEEE International Conference on Acoustics, Speech and Signal Processing, Apr. 15, 2018, pp. 4774-4778.
Chorowski, et al., "End-to-end Continuous Speech Recognition using Attention-based Recurrent NN: First Results", In Repository of arXiv:1412.1602v1, Dec. 4, 2014, 10 Pages.
Chung, et al., "Semi-supervised Training for Improving Data Efficiency in End-to-end Speech Synthesis", In Proceedings of International Conference on Acoustics, Speech and Signal Processing, May 12, 2019, pp. 6940-6944.
Cooper, et al., "Characteristics of Text-to-Speech and Other Corpora", In Proceedings of Speech Prosody, Jun. 13, 2018, pp. 690-694.
Cooper, Erica, "Text-to-Speech Synthesis Using Found Data for Low-Resource Languages", In Dissertation Submitted to Graduate School of Arts and Sciences, Jan. 29, 2019, 150 Pages.
Hori, et al., "Cycle-consistency Training for End-to-end Speech Recognition", In Proceedings of International Conference on Acoustics, Speech and Signal Processing, May 12, 2019, pp. 6271-6275.
Ito, Keith, "The LJ Speech Dataset", Retrieved From: https://keithito.com/LJ-Speech-Dataset/, 2017, 5 Pages.
Kaiser, et al., "Tensor2Tensor", Retrieved From: https://web.archive.org/web/20190130121118/https://github.com/tensorflow/tensor2tensor, Mar. 4, 2020, 6 Pages.
Karrer, Tony, "Text-to-Speech Costs—Licensing and Pricing", Retrieved From: http://elearningtech.blogspot.com/2010/11/text-to-speech-costs-licensing-and.html, Nov. 18, 2010, 3 Pages.
Kim, et al., "Sequence-Level Knowledge Distillation", In Proceedings of Conference on Empirical Methods in Natural Language Processing, Nov. 1, 2016, pp. 1317-1327.
Kuhl, et al., "Phonetic Learning as a Pathway to Language: New Data and Native Language Magnet Theory Expanded (NLM-E)", In Journal of Philosophical Transactions of the Royal Society B: Biological Sciences, vol. 363, Issue 1493, Mar. 12, 2008, pp. 979-1000.
Laurinciukaite, et al., "Lithuanian Speech Corpus Liepa for Development of Human-Computer Interfaces Working in Voice Recognition and Synthesis Mode", In Journal of Informatica vol. 29, Issue 3, Jan. 1, 2018, pp. 487-498.
Lewis, et al., "Ethnologue: Languages of the World", Retrieved From: https://www.ethnologue.com/sites/default/files/Ethnologue-18-Honduras.pdf, 2015, 22 Pages.
Li, et al., "Neural Speech Synthesis with Transformer Network", In Proceedings of Thirty-Third AAAI Conference on Artificial Intelligence, vol. 33, Issue 1, Jul. 17, 2019, pp. 6706-6713.
Liu, et al., "Completely Unsupervised Phoneme Recognition by Adversarially Learning Mapping Relationships from Audio Embeddings", In Proceedings of 19th Annual Conference of the International Speech Communication Association, Sep. 2, 2018, pp. 3748-3752.
Liu, et al., "Towards Unsupervised Speech Recognition and Synthesis with Quantized Speech Representation Learning", In Repository of arXiv:1910.12729v1, Oct. 28, 2019, 5 Pages.
Luong, et al., "Effective Approaches to Attention-based Neural Machine Translation", In Proceedings of the Conference on Empirical Methods in Natural Language Processing, Sep. 17, 2015, pp. 1412-1421.
Panayotov, et al., "Librispeech: An ASR Corpus based on Public Domain Audio Books", In Proceedings of IEEE International Conference on Acoustics, Speech and Signal Processing, Apr. 19, 2015, pp. 5206-5210.
Park, et al., "SpecAugment: A Simple Data Augmentation Method for Automatic Speech Recognition", In Proceedings of 20th Annual Conference of the International Speech Communication Association, Sep. 15, 2019, pp. 2613-2617.
Ping, et al., "Deep Voice 3: Scaling Text-To-Speech with Convolutional Sequence Learning", In Proceedings of Sixth International Conference on Learning Representations, Apr. 30, 2018, 16 Pages.

(56) References Cited

OTHER PUBLICATIONS

Press, et al., "Using the Output Embedding to Improve Language Models", In Proceedings of the 15th Conference of the European Chapter of the Association for Computational Linguistics: vol. 2, Short Papers, Apr. 3, 2017, pp. 157-163.

Ren, et al., "Almost Unsupervised Text to Speech and Automatic Speech Recognition", In Proceedings of 36th International Conference on Machine Learning, Jun. 9, 2019, 10 Pages.

Ren, et al., "FastSpeech: Fast, Robust and Controllable Text to Speech", In Proceedings of 33rd Conference on Neural Information Processing Systems, Dec. 8, 2019, 10 Pages.

Riviere, et al., "Unsupervised Pretraining Transfers Well Across Languages", In Repository of arXiv:2002.02848v1, Feb. 7, 2020, 7 Pages.

Rosenberg, et al., "Speech Recognition with Augmented Synthesized Speech", In Repository of arXiv:1909.11699v1, Sep. 25, 2019, 7 Pages.

Schneider, et al., "Wav2vec: Unsupervised Pre-training for Speech Recognition", In Proceedings of 20th Annual Conference of the International Speech Communication Association, Sep. 15, 2019, pp. 3465-3469.

Sennrich, et al., "Improving Neural Machine Translation Models with Monolingual Data", In Proceedings of the 54th Annual Meeting of the Association for Computational Linguistics (vol. 1: Long Papers), Aug. 7, 2016, pp. 86-96.

Shen, et al., "Natural TTS Synthesis by Conditioning Wavenet on MEL Spectrogram Predictions", In Proceedings of IEEE International Conference on Acoustics, Speech and Signal Processing, Apr. 15, 2018, pp. 4779-4783.

Sun, et al., "Token-Level Ensemble Distillation for Grapheme-to-Phoneme Conversion", In Proceedings of 20th Annual Conference of the International Speech Communication Association, Sep. 15, 2019, pp. 2115-2119.

Tan, et al., "Multilingual Neural Machine Translation with Knowledge Distillation", In Proceedings of International Conference on Learning Representations, May 6, 2019, 15 Pages.

Thu, et al., "Comparison of Grapheme-to-Phoneme Conversion Methods on a Myanmar Pronunciation Dictionary", In Proceedings of the 6th Workshop on South and Southeast Asian Natural Language Processing, Dec. 11, 2016, pp. 11-22.

Tjandra, et al., "Listening While Speaking: Speech Chain by Deep Learning", In Proceedings of Automatic Speech Recognition and Understanding Workshop (ASRU), Dec. 16, 2017, pp. 301-308.

Vaswani, et al., "Attention Is All You Need", In Proceedings of 31st Conference on Neural Information Processing Systems, Dec. 4, 2017, 11 Pages.

Wang, et al., "Tacotron: Towards End-to-End Speech Synthesis", In Proceedings of 18th Annual Conference of the International Speech Communication Association, Aug. 20, 2017, pp. 4006-4010.

Xu, et al., "LRSpeech: Extremely Low-Resource Speech Synthesis and Recognition", In Proceedings of the 26th ACM SIGKDD International Conference on Knowledge Discovery & Data Mining, Aug. 23, 2020, pp. 2802-2812.

Yamagishi, et al., "Thousands of Voices for HMM-Based Speech Synthesis-Analysis and Application of TTS Systems Built on Various ASR Corpora", In Journal of IEEE Transactions on Audio, Speech, and Language Processing vol. 18, Issue 5, Jul. 2010, pp. 984-1004.

Yamamoto, et al., "Parallel Wavegan: A Fast Waveform Generation Model Based on Generative Adversarial Networks With Multi-Resolution Spectrogram", In Repository of arXiv:1910.11480v1, Oct. 25, 2019, 5 Pages.

Yeh, et al., "Unsupervised Speech Recognition via Segmental Empirical Output Distribution Matching", In Proceedings of 7th International Conference on Learning Representations, May 6, 2019, 14 Pages.

Zhu, et al., "Unpaired Image-to-Image Translation using Cycle-Consistent Adversarial Networks", In Proceedings of the IEEE International Conference on Computer Vision, Oct. 22, 2017, pp. 2242-2251.

Alarcon, Nefi, "Microsoft Leverages the Power of NVIDIA GPUs to Enhance Speech Recognition Algorithms", Retrieved From: https://developer.nvidia.com/blog/microsoft-enhances-sra-tts-algorithms/, May 22, 2019, 2 Pages.

Bansal, et al., "Pre-Training on High-Resource Speech Recognition Improves Low-Resource Speech-to-Text Translation", In Repository of arXiv:1809.01431v1, Sep. 5, 2018, 8 Pages.

Baskar, et al., "Self-supervised Sequence-to-sequence ASR using Unpaired Speech and Text", In Repository of arXiv:1905.01152v1, Apr. 30, 2019, 6 Pages.

Jia, et al., "Leveraging Weakly Supervised Data to Improve End-To-End Speech-To-Text Translation", In Repository of ofarXiv:1811.02050v1, Nov. 5, 2018, 5 Pages.

Lee, et al., "Learning Pronunciation from a Foreign Language in Speech Synthesis Networks", In Repository of arXiv:1811.09364v1, Nov. 23, 2018, 10 Pages.

Luong, et al., "Bootstrapping Non-Parallel Voice Conversion from Speaker-Adaptive Text-to-Speech", In Repository of arXiv:1909.06532v1, Sep. 14, 2019, 8 Pages.

"International Search Report and Written Opinion Issued in PCT Application No. PCT/US21/032128", Mailed Date: Sep. 9, 2021, 9 Pages.

Toshniwal, et al., "Multilingual Speech Recognition With a Single End-To-End Model", In Repository of arXiv:1711.01694v1, Nov. 6, 2017, 5 Pages.

Wind, Jan, "The Evolutionary History of the Human Speech Organs", Published in Studies in Language Origins, vol. 1, Jan. 1989, pp. 173-197.

Nakayama, et al., "Speech Chain for Semi-supervised Learning of Japanese English Code-switching ASR and TTS", IEEE Spoken Language Technology Workshop, 2018, pp. 182-189.

Office Action Received for Chinese Application No. 202010620533.5, mailed on Nov. 30, 2024, 19 pages. (English Translation Provided).

Wang et al., "Automatic Segmentation for TTS Units", Microelectronics and computers, No. 12, Dec. 22, 2005, 4 pages.

Notice of Grant Received for Chinese Application No. 202010620533.5, mailed on Jul. 11, 2025, 4 pages. (English Translation Provided).

\* cited by examiner

SPEECH SYNTHESIS AND SPEECH RECOGNITION

CROSS-REFERENCE TO RELATED APPLICATION

This application is a U.S. National Stage Filing under 35 U.S.C. 371 of International Patent Application Serial No. PCT/US2021/032128, filed May 13, 2021, and published as WO 2022/005625 A1 on Jan. 6, 2022, which claims priority to Chinese Application No. 202010620533.5, filed Jun. 30, 2020, which applications and publication are incorporated herein by reference in their entirety.

BACKGROUND

Speech synthesis (also referred to as Text to Speech, TTS) and speech recognition (also referred to as Automatic Speech Recognition, ASR) are important speech tasks and require a large amount of text and speech data for model training. However, there are more than 6,000 languages in the world and most of them lack speech training data. It is quite difficult to provide TTS and ASR functions for these languages lacking speech training data, since a large amount of expensive speech training data is required to ensure the accuracy of the trained TTS and ASR models.

SUMMARY

In accordance with implementations of the subject matter described herein, a solution for speech synthesis and speech recognition is provided. In this solution, a Text to Speech (TTS) model and an Automatic Speech Recognition (ASR) model supporting at least one language are obtained. The TTS model and the ASR model are adjusted, based on a first set of paired data in a target language, to support the target language. The first set of paired data comprises speech data in the target language from multiple speakers and corresponding text data. Then, the TTS model is optimized based on the first set of paired data and a first set of synthesized paired data in the target language while the ASR model is optimized based on the first set of paired data and a second set of synthesized paired data in the target language. The first set of synthesized paired data comprises a first set of speech data from multiple speakers and a first set of text data generated by the ASR model based on the first set of speech data, and the second set of synthesized paired data comprises a second set of text data and a second set of speech data of multiple speakers generated by the TTS model based on the second set of text data. In this way, the solution can provide TTS and ASR models with high accuracy for languages lacking training data by using less training data.

The Summary is to introduce a selection of concepts in a simplified form that are further described below in the Detailed Description. This Summary is not intended to identify key features or essential features of the subject matter as described herein, nor is it intended to be used to limit the scope of the subject matter as described herein.

BRIEF DESCRIPTION OF THE DRAWINGS

Throughout the drawings, the same or similar reference symbols refer to the same or similar elements.

DETAILED DESCRIPTION

Figure 1A:
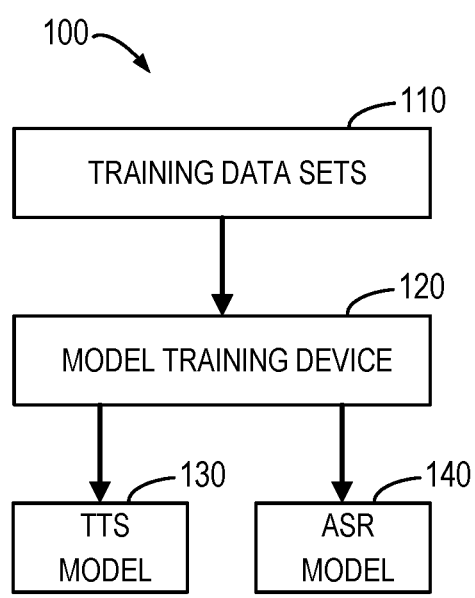
FIG. 1A and FIG. 1B illustrate schematic diagrams of an example environment in which implementations of the subject matter described herein can be implemented.

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As described above, speech synthesis (also referred to as Text to Speech, TTS) and speech recognition (also referred to as Automatic Speech Recognition, ASR) are important speech tasks.

TTS aims to synthesize intelligible and natural speech based on text. Training of a TTS model usually requires single-speaker high-quality recordings that are collected in a professional recording studio. To improve accuracy of pronunciation, the TTS model often requires a pronunciation lexicon to convert a character sequence into phoneme sequences as the model input, which is referred to as grapheme-to-phoneme conversion. Additionally, the TTS model uses text normalization rules to convert the irregular word into the normalized type that is easier to pronounce.

ASR aims to generate correct text from speech sequence. Training of an ASR model usually requires speech data from multiple speakers, such that the trained ASR model can recognize speech data from an unknown speaker. The multi-speaker speech data for training the ASR model do not need to be as high-quality as that in TTS, but the data amount is usually an order of magnitude bigger. Optionally, the ASR model can first recognize the speech into phoneme sequences, and further convert them into a character sequence with the pronunciation lexicon as in the TTS model.

In traditional solutions, for languages having rich speech training data (also referred to as rich-resource languages), it usually requires a large amount of paired speech and text data to train the TTS model and the ASR model for high precision. For example, dozens of hours of single-speaker high-quality recordings and their corresponding texts (also referred to as "single-speaker high-quality paired data") are usually needed for training the TTS model while at least hundreds of hours of multi-speaker low-quality speech data and their corresponding texts (also referred to as "multi-speaker low-quality paired data") are required for training the ASR model. In addition, for the rich-resource languages, the TTS model may also use the pronunciation lexicon to enhance pronunciation accuracy. Optionally, performance of the TTS and ASR models may be improved by using unpaired speech data and unpaired text data.

Traditionally, for languages lacking speech training data (also referred to aslow-resource languages), the single-speaker high-quality paired data for training the TTS model are reduced to dozens of minutes while the multi-speaker low-quality paired data for training the ASR model may be reduced to dozens of hours. Additionally, the unpaired speech and text data are often used for the low-resource languages to enhance the performance of the TTS and ASR models.

As can be seen from the above description, traditional solutions usually need a large amount of text and speech data for model training, to ensure accuracy of the TTS and ASR models. However, there are more than 6,000 languages in the world and most of them lack speech training data. Although the amount of training data can be reduced for the low-resource languages, the collection of speech and text paired data (e.g., tens of minutes of data for the TTS model and tens of hours of data for the ASR model), the pronunciation lexicon and a large amount of single-speaker high-quality unpaired speech data will still incur high data collection cost. Moreover, the accuracy of the TTS and ASR models in the low-resource setting is usually low.

In accordance with implementations of the subject matter as described herein, there is provided a solution for speech synthesis and recognition, which can provide TTS and ASR models with relatively high accuracy for low-resource languages at low data collection cost.

In order to achieve low data collection cost, this solution only uses the following data to train the TTS and ASR models: 1) as few as possible (for example, several minutes) single-speaker high-quality paired data; 2) relatively few (for example, several hours) multi-speaker low-quality paired data; and 3) slightly more (for example, dozens of hours) multi-speaker low-quality unpaired speech data. Compared with the traditional solution, this solution does not use single-speaker high-quality unpaired speech data and does not use the pronunciation lexicon, thereby significantly saving data collection cost for training the TTS and ASR models.

In order to achieve high accuracy, this solution first pre-trains both TTS and ASR models on a plurality of rich-resource languages with a large amount of paired data, so as to learn the alignment ability between speech and text. Then, the solution adjusts the TTS and ASR models supporting multiple languages to the target language (e.g., a low-resource language). This solution further performs dual transformation between the TTS and ASR models to iteratively improve the accuracy of each other by using unpaired speech and text data. Moreover, the solution synthesizes paired data with the TTS and ASR models (obtained from the dual transformation) to train target TTS and ASR models, such that the target TTS model can support single-speaker high-quality speech and both the target TTS and ASR models gain improvement in accuracy.

TTS and ASR are usually formulated as sequence to sequence problems. Assuming the text and speech sequence pair is denoted as $(x,y) \in D$, where D represents the paired text and speech corpus for training the TTS and ASR models. Each element in the text sequence x indicates a phoneme or character while each element in the speech sequence y represents a phonetic unit (also referred to as "frame"). In some implementations, in order to train the TTS model θ, a mean square error loss function below may be used:

$$\mathcal{L}(\theta;D)=-\Sigma_{(x,y)\in D}(y-f(x;\theta))^2 \quad (1)$$

where $f(x;\theta)$ represents a speech sequence generated by the TTS model θ corresponding to the text sequence x. In some implementations, in order to train the ASR model φ, a negative log likelihood loss function below may be used:

$$\mathcal{L}(\phi;D)=-\Sigma_{(y,x)\in D}\log P(x|y;\phi) \quad (2)$$

TTS and ASR models may be trained based on an encoder-attention-decoder framework, where the encoder transforms the source sequence into a set of hidden representations, and the decoder generates the target sequence auto-regressively based on the source hidden representations obtained through an attention mechanism.

In the following text, paired data for training the TTS model on the rich-resource languages are denoted as $D_{rich\_tts}$ while paired data for training the ASR model on the rich-resource languages are represented as $D_{rich\_asr}$. Single-speaker high-quality paired data for the target speaker is also denoted as $D_h$ while multi-speaker low-quality paired data is denoted as $D_l$. Unpaired text data is denoted as $X^u$ and multi-speaker low-quality unpaired data is denoted as $Y^u$.

Various implementations of the subject matter are further described in details below with reference to the drawings.

Figure 1B:
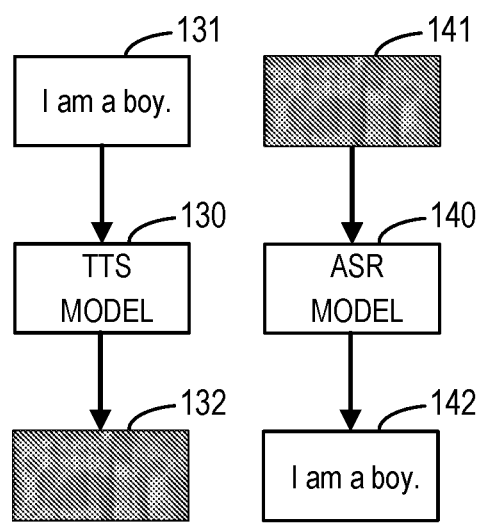

FIGS. 1A and 1B illustrate schematic diagrams of an example environment 100 in which implementations of the subject matter can be implemented. As shown in FIG. 1A, the environment 100 may include a model training device 120 configured to train a TTS model 130 and an ASR model 140 based on a training dataset 110. As shown in FIG. 1B, the TTS model 130 may generate, based on input text 131, speech 132 corresponding to the text 131 while the ASR model 140 may generate, based on input speech 141, text 142 corresponding to the speech 141. It should be understood that the structure and functions of the environment 100 are described merely for the purpose of illustration, without suggesting any limitation as to the scope of the subject matter. Implementations of the subject matter described herein can also be applied to an environment with different structure and/or functions.

Figure 2:
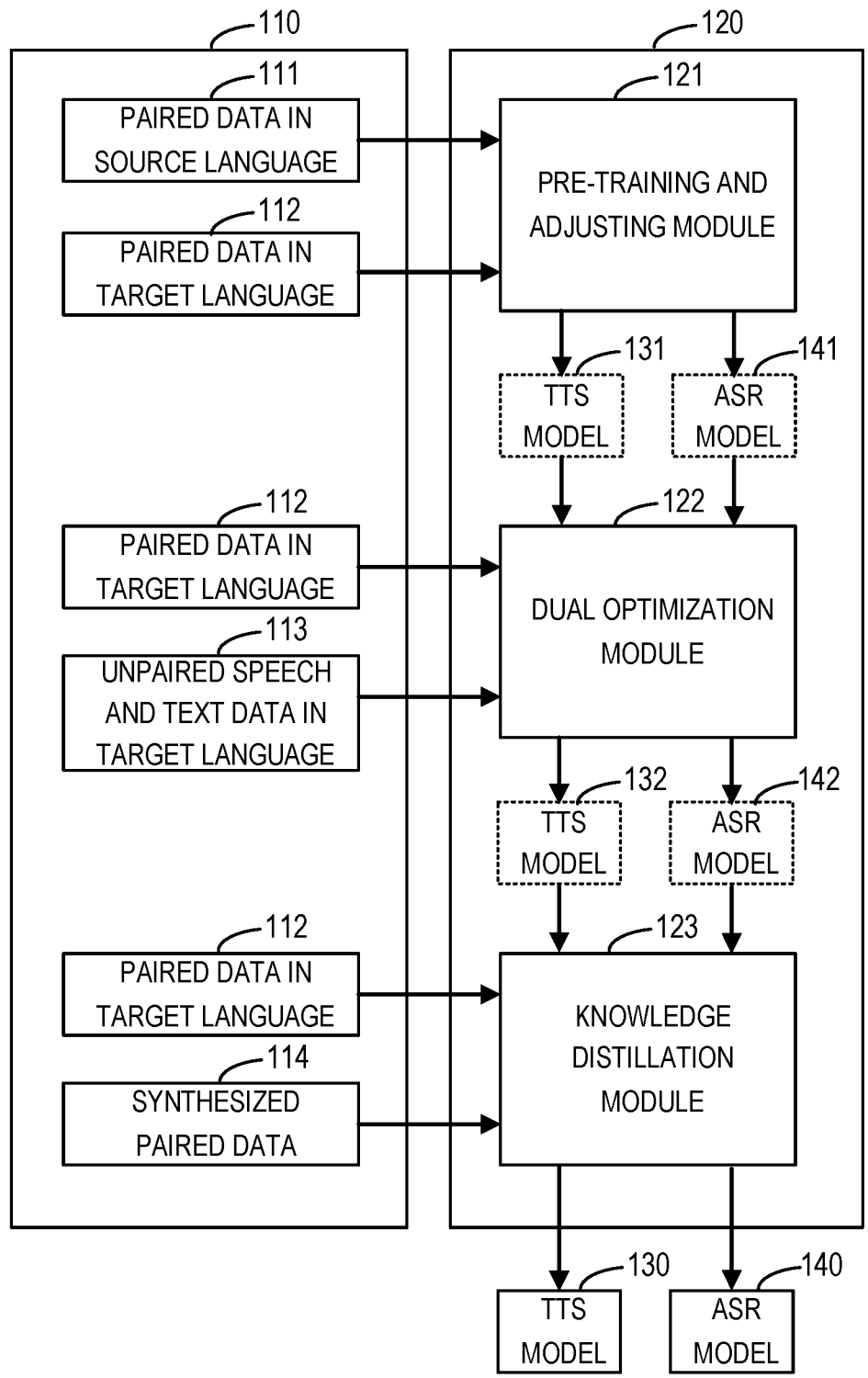
FIG. 2 illustrates a schematic block diagram of the working principle of the model training device in accordance with implementations of the subject matter described herein.

FIG. 2 illustrates a schematic block diagram of the working principle of the model training device 120 in accordance with implementations of the subject matter described herein. As shown in FIG. 2, the model training device 120 may include a pre-training and adjusting module 121, a dual optimization module 122 and a knowledge distillation module 123. It is to be understood that the structure and functions of the model training device 120 are described merely for the purpose of illustration, without suggesting any limitation as to the scope of the subject matter. In some implementations, the model training device 120 may be implemented in a structure different from that in FIG. 2.

As shown in FIG. 2, the training dataset 110 may include a set of paired data 111 (also referred to as "second set of paired data" in the text) in at least one source language. The paired data 111 may include a plurality of speech and text data pairs in the at least one source language, where the speech data may come from a plurality of speakers. The pre-training and adjusting module 121 is configured to pre-train, based on the second set of paired data 111, TTS and ASR models supporting the at least one source language. The at least one source language may be rich-resource language(s), such as English, Chinese and the like. The reason for using the pairing data of resource-rich languages to pre-train the TTS model and ASR model is: 1) in commercial voice services, the paired data for resource-rich languages is often easy to obtain; 2) in addition, due to the pronunciation similarity between different human languages, the ability to align speech and text learned on rich-resource languages can be transferred to a low-resource language. In some implementations, the second set of paired data 111 may include $D_{rich\_tts}$ and $D_{rich\_asr}$. The pre-training and adjusting module 121 may pre-train the TTS model $\theta$ based on $D_{rich\_tts}$ according to the above formula (1) and pre-train the ASR model $\varphi$ based on $D_{rich\_asr}$ according to the above formula (2).

As shown in FIG. 2, the training dataset 110 also may include a set of paired data 112 (also referred to as "first set of paired data" in the text) in a target language. The target source may be different from the at least one source language. For example, the target language may be a low-resource language. The first set of paired data 112 may include a plurality of speech and text data pairs in the target language, where the speech data may come from a plurality of speakers. The pre-training and adjusting module 121 is configured to adjust, based on the first set of paired data 112, the pre-trained TTS and ASR models to obtain a TTS model 131 and an ASR model 141 supporting the target language.

Source and target languages usually have vocabularies including different phonemes/characters and are associated with different speakers. In some implementations, the pre-training and adjusting module 121 may initialize the TTS model on the target language using all the pre-trained parameters in the pre-trained TTS model except the phoneme/character embedding and speaker embedding. Likewise, the pre-training and adjusting module 121 may initialize the ASR model on the target language using all the pre-trained parameters in the pre-trained ASR model except the phoneme/character embedding and speaker embedding. In some implementations, the first set of paired data 112 may include single-speaker high-quality paired data $D_h$ for the target speaker and multi-speaker low-quality paired data $D_l$. The pre-training and adjusting module 121 may adjust the pre-trained TTS model $\theta$ based on $D_h$ and $D_l$ according to the above formula (1) to support the target language, and adjust the pre-trained ASR model $\varphi$ based on $D_h$ and $D_l$ according to the above formula (2) to support the target language.

TTS and ASR are two dual tasks and their dual nature can be explored to improve the accuracy of each other, especially in the low-resource scenarios.

In some implementations, the dual optimization module 122 may perform dual training between TTS and ASR to improve the conversion ability between text and speech. Specifically, as shown in FIG. 2, the training dataset 110 may include unpaired speech and text data sets 113 in the target language, where the set of unpaired speech data is also referred to as "first set of speech data" including a plurality of $Y^u$ for example, and the set of unpaired text data is also referred to as "second set of text data" including a plurality of $X^u$ for example. In some implementations, the dual optimization module 122 may generate, using the ASR model 141, corresponding text data for each $Y^u$ in the first set of speech data. The dual optimization module 122 may combine the first set of speech data and the corresponding text data (also referred to as "first set of text data" in the text) generated by the ASR model 141 based on the first set of speech data into a first set of synthesized paired data, and train the TTS model $\theta$ according to the above formula (1). Since the ASR model can recognize speech of a plurality of speakers, by using the ASR model to convert the speech from multiple speakers into corresponding texts can facilitate training of the TTS model that can synthesize speech of multiple speakers. In addition, since the ASR model can recognize speech from an unknown speaker, using the synthesized paired data to train the TTS model enables the TTS model to synthesize speech of an unknown speaker. In some implementations, the dual optimization module 122 may generate, using the TTS model 131, corresponding speech data for each $X^u$ in the second set of text data. For example, the dual optimization module 122 may randomly select a speaker identifier (ID) and synthesize speech of the speaker based on the $X^u$. The dual optimization module 122 may combine the second set of text data and corresponding speech data (also referred to as "second set of speech data" in the text) generated by the TTS model 131 based on the second set of text data into a second set of synthesized paired data, and train the ASR model $\varphi$ according to the above formula (2). In this way, it facilitates the training of the ASR model which can recognize speech from multiple speakers.

In some implementations, the dual optimization module 122 may optimize the TTS and ASR models in multiple iterations, wherein the latest TTS and ASR models are used in each iteration to generate new synthesized paired data for each other. Additionally or alternatively, in some implementations, in the process of iteratively optimizing the TTS and ASR models, the dual optimization module 122 may also use the paired data 112 in addition to the synthesized paired data for each other, to ensure the accuracy of the trained TTS and ASR models. For example, the dual optimization module 122 may perform the training based on the paired data synthesized from the unpaired data in this iteration, and perform the training based on the paired data 112 in the next iteration. For another example, the dual optimization module 122 may use the combined paired data and the paired data 112 in a predetermined ratio (for example, 1:1) to perform the training in each iteration. In this way, the dual optimization module 122 can obtain the optimized TTS model 132 and ASR model 142 supporting multiple speakers.

In some situations, the dual-trained TTS model 132 and ASR model 142 may not adapt to the requirements of online due to following reasons: 1) although the TTS model 132 can support multiple speakers, the speech quality for a target speaker may be not good enough; 2) the speech synthesized by the TTS model 132 may have word skipping and repeating issues; 3) the accuracy of the ASR model 142 needs to be further improved.

In some implementations, as shown in FIG. 2, the knowledge distillation module 123 may train the target TTS model 130 and the target ASR model 140 based on the first set of paired data 112 and a plurality of sets of synthesized paired data 114 generated by the TTS model 132 and the ASR model 142, such that the target TTS model 130 can synthesize high-quality speech for a single speaker and the accuracy of the target TTS model 130 and the target ASR model 140 can be further improved.

In some implementations, as described above, the paired data 112 may include single-speaker high-quality paired data $D_h$ for the target speaker and multi-speaker low-quality paired data $D_l$. In order to enable the target TTS model 130 to synthesize high-quality speech of the target speaker, the knowledge distillation module 123 may extract, from the paired data 112, the single-speaker high-quality paired data $D_h$ for the target speaker (also referred to as "third set of paired data" in the text) to train the target TTS model 130.

In some implementations, the knowledge distillation module 123 also may synthesize, using the TTS model 132, a large amount of speech data (also referred to as "third set of speech data" in the text) of the target speaker based on a large amount of unpaired text data (also referred to as "third set of text data" in the text). The third set of text data, for example, includes a plurality of $X^u$. In some implementations, the knowledge distillation module 123 may synthesize corresponding speech data of the target speaker for each $X^u$ in the third set of text data using the TTS model 132. For example, the knowledge distillation module 123 may input the text $X^u$ and the ID of the target speaker to the TTS model 132 so as to synthesize the speech of the target speaker. The knowledge distillation module 123 may combine the third set of text data and the third set of speech data into a third set of synthesized paired data for training the target TTS model. Additionally or alternatively, since the third set of speech data in the TTS model 132 may have word skipping and repeating issues, in some implementations, the knowledge distillation module 123 may remove unqualified speech data from the third set of speech data and remove text data corresponding to the unqualified speech data from the third set of text data, so as to obtain a fourth set of synthesized paired data. The knowledge distillation module 123 may train the target TTS model 130 based on the third set of paired data extracted from the paired data 112 and the fourth set of synthesized paired data according to the above formula (1), such that the target TTS model 130 can synthesize, based on input text data in the target language, corresponding high-quality speech of the target speaker.

In some implementations, the unqualified speech data removed by the knowledge distillation module 123 may include at least one of: speech data with missing words; speech data with repeated words; and incomprehensible speech data. In some implementations, the knowledge distillation module 123 may remove the unqualified speech data from the third set of speech data based on at least one of the following indicators: Word Coverage Ratio (WCR) and Attention Diagonal Ratio (ADR), where the WCR is inversely correlated with a possibility that missing words or repeated words exist in the speech data and the ADR indicates an alignment degree between speech data and text data used to synthesize the speech data.

In some implementations, the knowledge distillation module 123 may determine the WCR of the synthesized speech data according to the following formula:

$$WCR = \min_{i \in [1,N]} \left\{ \max_{t \in [1,T_i]} \max_{s \in [1,S]} A_{t,s} \right\} \quad (3)$$

where N represents the number of words in a text corresponding to the synthesized speech data, $T_i$ represents the number of characters in the i-th word and S denotes the number of frames in the target acoustic spectrum corresponding to the synthesized speech. $A_{t,s}$ represents an element in the t-th row and s-th column of an attention weight matrix A, where the attention weight matrix A may be determined based on the encoder-decoder attention weights in the TTS model 132. The WCR is negatively correlated with a possibility of occurrence of word skipping or word repeating in the synthesized speech data. In other words, a high WCR indicates a low possibility of occurrence of word skipping or word repeating in the synthesized speech data. In some implementations, the knowledge distillation module 123 may remove the speech data with WCR lower than a predetermined threshold from the third set of speech data.

In some implementations, the knowledge distillation module 123 may determine ADR of the synthesized speech data according to the following formula:

$$ADR = \frac{\sum_{t=1}^{T} \sum_{s=kt-b}^{kt+b} A_{t,s}}{\sum_{t=1}^{T} \sum_{s=1}^{S} A_{t,s}} \quad (4)$$

where T represents the number of characters in the text corresponding to the synthesized speech data, S represents the number of frames in the synthesized speech data, k=S/T, and b denotes a hyper-parameter for determining the width of diagonal. A high ADR indicates that the synthesized speech has good attention alignment with the corresponding text and the possibility of occurrence of word skipping, repeating or crashing issues (unintelligible) is relatively low. In some implementations, the knowledge distillation module 123 may remove the speech data with ADR lower than a predetermined threshold from the third set of speech data.

In some implementations, the knowledge distillation module 123 may synthesize, using the TTS model 132, the speech data of multiple speakers (also referred to as "fourth set of speech data" in the text) based on a large amount of unpaired text data (also referred to as "third set of text data" in the text). The third set of text data, for example, includes a plurality of $X^u$. In some implementations, the knowledge distillation module 123 may randomly select a speaker ID for each $X^u$ in the third set of text data and synthesize the speech of the speaker for the $X^u$. The knowledge distillation module 123 may combine the third set of text data and the fourth set of speech data into a fifth set of synthesized paired data for training the target ASR model. Additionally or alternatively, in some implementations, the knowledge distillation module 123 may generate, based on a large amount of unpaired speech data (also referred to as "fifth set of speech data" in the text), corresponding text data (also referred to as "fourth set of text data" in the text) using the ASR model 142. The knowledge distillation module 123 may combine the fifth set of speech data and the fourth set of text data into a sixth set of synthesized paired data, so as to train the target ASR model. In some implementations, the knowledge distillation module 123 may train the ASR model 140 based on the paired data 112 (including single-speaker high-quality paired data $D_h$ for the target speaker and multi-speaker low-quality paired data $D_l$), a fifth set of synthesized paired data and a sixth set of synthesized paired data according to the above formula (2), such that the target ASR model 140 can generate, based on speech data in the target language from multiple speakers, text data corresponding to the speech data.

Figure 3A:
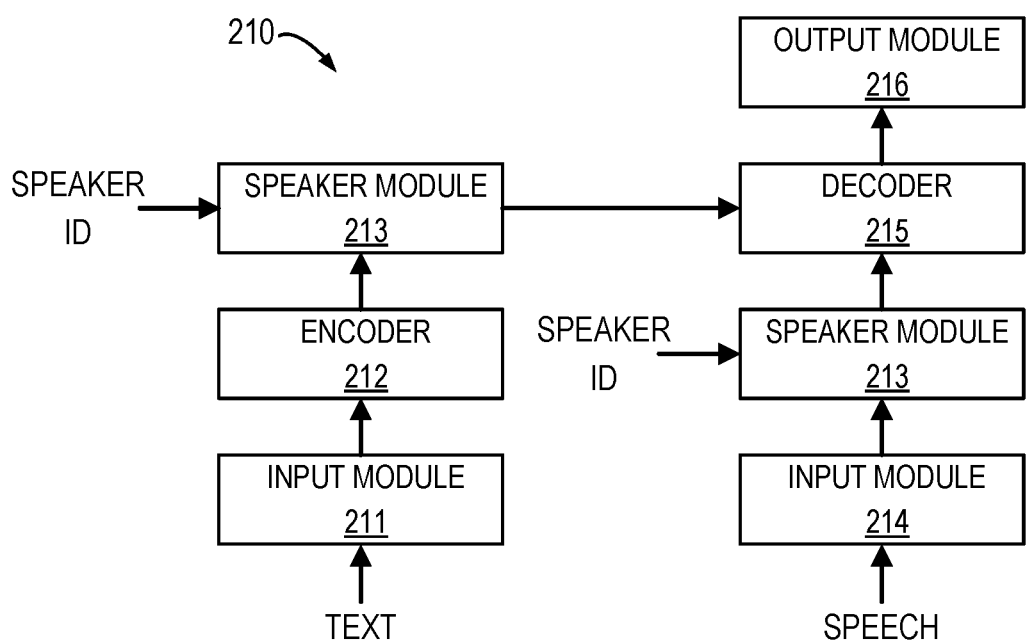
FIG. 3A illustrates a block diagram of an example model structure of a TTS model in accordance with implementations of the subject matter described herein.
Figure 3B:
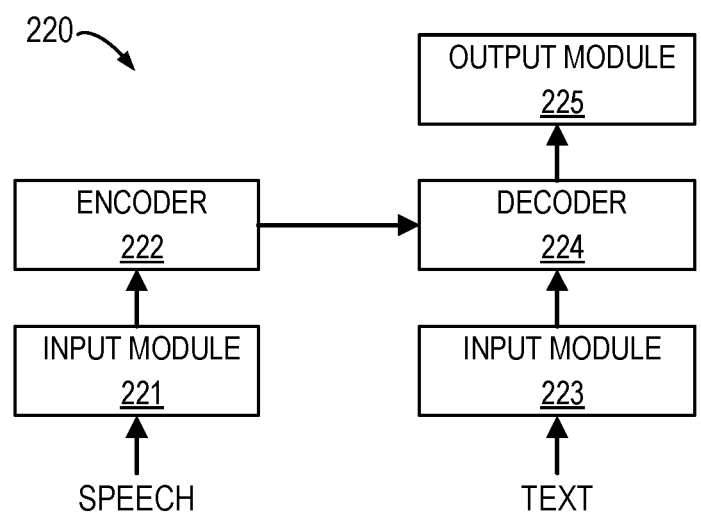
FIG. 3B illustrates a block diagram of an example model structure of an ASR model in accordance with implementations of the subject matter described herein.

FIG. 3A illustrates a block diagram of an example model structure 210 of the TTS model in accordance with implementations of the subject matter described herein and FIG. 3B illustrates a block diagram of an example model structure 220 of the ASR model in accordance with implementations of the subject matter. For example, the TTS models 130, 131 and 132 in FIG. 2 may have the model structure 210 as shown in FIG. 3A, while the ASR models 140, 141 and 142 may have the model structure 220 as shown in FIG. 3B. In some implementations, as shown in FIGS. 3A and 3B, both the TTS model and the ASR model may adopt a transformer-based encoder-attention-decoder structure. In some implementations, in order to better capture the dependencies in a long speech sequence, the feed-forward network in the traditional transformer models may be replaced with a one-dimensional convolution network to implement the TTS and ASR models.

As shown in FIG. 3A, the TTS model 210 may include a text input module 211, an encoder 212, a speaker module 213, a speech input module 214, a decoder 215 and an output module 216. In the TTS model 210, the input module 211 of the encoder 212 may be a character/phoneme embedding vector lookup table for converting a character/phoneme ID into an embedding vector. The input module 214 of the decoder 215 may be a speech pre-net layer including a plurality of dense layers to transform the speech signals non-linearly. The output module 216 of the decoder 215 includes a linear layer converting hidden representations into linear layers of the acoustic spectrum and a stop linear layer predicting with a sigmoid function whether the current step should stop or not. The TTS model 210 supporting multiple speakers differentiates the multiple speakers using the speaker module 213. In some implementations, a speaker embedding vector may be added to both the output of the encoder 212 and the input of the decoder 215 (i.e., output of the input module 214). Specifically, the speaker ID may be converted into a speaker embedding vector using an embedding vector lookup table, and then a linear transformation and a softsign function (e.g., $x=x/(1+|x|)$) are applied into the speaker embedding vector. Then, the conversion result is connected with the output of the encoder 212 or the input of the decoder 215 and the hidden vector dimension is reduced by a further linear layer to the original dimension of the output of the encoder 212 or of the input of the decoder 215. The encoder 212 and the decoder 215 may have the same implementations as those in the traditional solutions and thus will not be repeated here.

As shown in FIG. 3B, the ASR model 220 may include a speech input module 214, an encoder 222, a text input module 223, a decoder 224 and an output module 225. In the ASR model 220, the input module 221 of the encoder 222 may include a plurality of convolution layers to reduce a length of the speech sequence. The input module 223 of the decoder 224 may be a character/phoneme embedding vector lookup table while the output module 225 of the decoder 224 may include a linear layer and a softmax function, where the linear layer shares the same weights with the character/phoneme embedding vector lookup table in the input module 223. Both the encoder 222 and the decoder 224 may have the same implementations as those in the traditional solutions and thus will not be repeated here.

Figure 4:
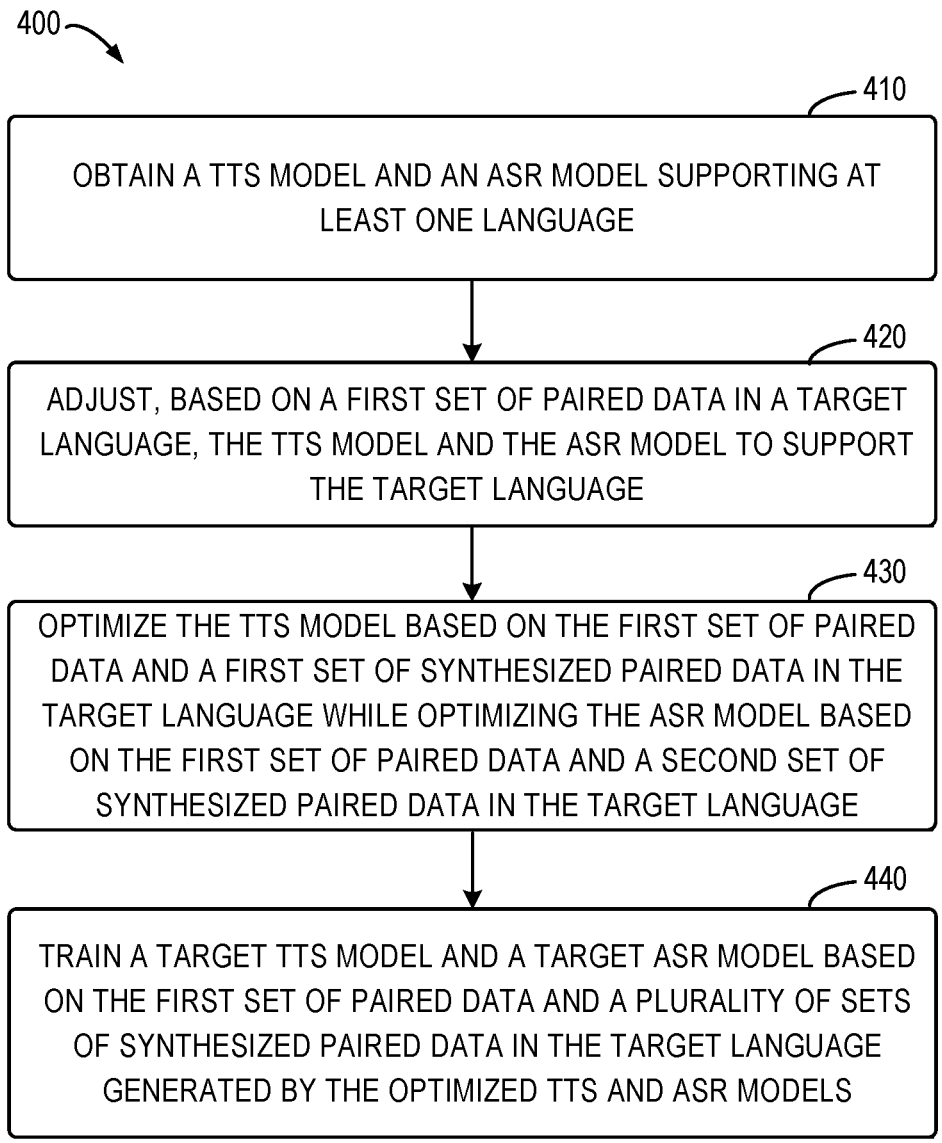
FIG. 4 illustrates a flowchart of an example method for training the TTS and ASR models in accordance with implementations of the subject matter described herein.

FIG. 4 illustrates a flowchart of an example method 400 for training the TTS and ASR models in accordance with implementations of the subject matter described herein. For example, the method 400 may be implemented by the model training device 120 shown in FIGS. 1 and 2. It is to be understood that the method 400 also may include additional acts not shown and/or omit the illustrated acts and the scope of the subject matter described herein is not limited in this regard.

As shown in FIG. 4, at block 410, the model training device 120 obtains a TTS model and an ASR model supporting at least one language.

In some implementations, obtaining the TTS model and the ASR model comprises: training, based on a second set of paired data in the at least one language, the TTS model and the ASR model, wherein the second set of paired data comprises speech data in the at least one language from multiple speakers and corresponding text data.

At block 420, the model training device 120 adjusts, based on a first set of paired data in a target language, the TTS model and the ASR model to support the target language, wherein the first set of paired data comprises speech data in the target language from multiple speakers and corresponding text data.

In some implementations, the target language is different from the at least one language.

At block 430, the model training device 120 optimizes the TTS model based on the first set of paired data and a first set of synthesized paired data in the target language while optimizing the ASR model based on the first set of paired data and a second set of synthesized paired data in the target language, wherein the first set of synthesized paired data comprises a first set of speech data from multiple speakers and a first set of text data generated by the ASR model based on the first set of speech data, and the second set of synthesized paired data comprises a second set of text data and a second set of speech data of multiple speakers generated by the TTS model based on the second set of text data.

At block 440, the model training device 120 trains a target TTS model and a target ASR model based on the first set of paired data and a plurality of sets of synthesized paired data in the target language generated by the optimized TTS model and the optimized ASR model.

In some implementations, training the target TTS model comprises: obtaining, from the first set of paired data, a third set of paired data associated with a target speaker in the plurality of speakers, wherein the third set of paired data comprises speech data in the target language from the target speaker and corresponding text data; generating, using the optimized TTS model, a third set of synthesized paired data in the target language, wherein the third set of synthesized paired data comprises a third set of text data and a third set of speech data of the target speaker generated by the optimized TTS model based on the third set of text data; and training the target TTS model based on the third set of paired data and the third set of synthesized paired data, such that the target TTS model can generate, based on text data in the target language, speech data of the target speaker corresponding to the text data.

In some implementations, training the target TTS model based on the third set of paired data and the third set of synthesized paired data comprises: obtaining a fourth set of synthesized paired data by removing unqualified speech data from the third set of speech data and removing text data corresponding to the unqualified speech data from the third set of text data; and training the target TTS model based on the third set of paired data and the fourth set of synthesized paired data.

In some implementations, the unqualified speech data comprises at least one of: speech data with missing words; speech data with repeated words; and incomprehensible speech data.

In some implementations, removing the unqualified speech data comprises: removing, from the third set of speech data, speech data with a Word Coverage Rate (WCR) lower than a predetermined threshold, wherein the WCR is inversely correlated with a possibility that missing words or repeated words exist in the speech data.

In some implementations, removing the unqualified speech data comprises: removing, from the third set of speech data, speech data with an Attention Diagonal Ratio (ADR) lower than a predetermined threshold, wherein the ADR indicates an alignment degree between the speech data and text data used to generate the speech data in the third set of text data.

In some implementations, training the target ASR model comprises: generating, using the optimized TTS model, a fifth set of synthesized paired data in the target language, wherein the fifth set of synthesized paired data comprises a third set of text data and a fourth set of speech data of multiple speakers generated by the optimized TTS model based on the third set of text data; generating, using the optimized ASR model, a sixth set of synthesized paired data in the target language, wherein the sixth set of synthesized paired data comprises a fifth set of speech data from multiple speakers and a fourth set of text data generated by the optimized ASR model based on the fifth set of speech data; and training the target ASR model based on the first set of paired data, the fifth set of synthesized paired data and the sixth set of synthesized paired data, such that the target ASR model can generate, based on speech data in the target language from multiple speakers, text data corresponding to the speech data.

It can be seen from the above that, the subject matter as described herein provides a solution for speech synthesis and recognition. This solution can provide TTS and ASR models with relatively high accuracy for low-resource languages at low data collection cost.

In order to achieve low data collection cost, this solution only uses the following data to train the TTS and ASR models: 1) as few as possible (for example, several minutes) single-speaker high-quality paired data; 2) relatively few (for example, several hours) multi-speaker low-quality paired data; and 3) slightly more (for example, dozens of hours) multi-speaker low-quality unpaired speech data. Compared with the traditional solution, this solution does not use single-speaker high-quality unpaired speech data and does not use the pronunciation lexicon, thereby significantly saving data collection cost for training the TTS and ASR models.

In order to achieve high accuracy, this solution first pre-trains both TTS and ASR models on a plurality of rich-resource languages with a large amount of paired data, so as to learn the alignment ability between speech and text. Then, the solution adjusts the TTS and ASR models supporting multiple languages to the target language (e.g., a low-resource language). This solution further performs dual transformation between the TTS and ASR models to iteratively improve the accuracy of each other by using unpaired speech and text data. Moreover, the solution synthesizes paired data with the TTS and ASR models (obtained from the dual transformation) to train target TTS and ASR models, such that the target TTS model can support single-speaker high-quality speech and both the target TTS and ASR models gain improvement in accuracy.

Figure 5:
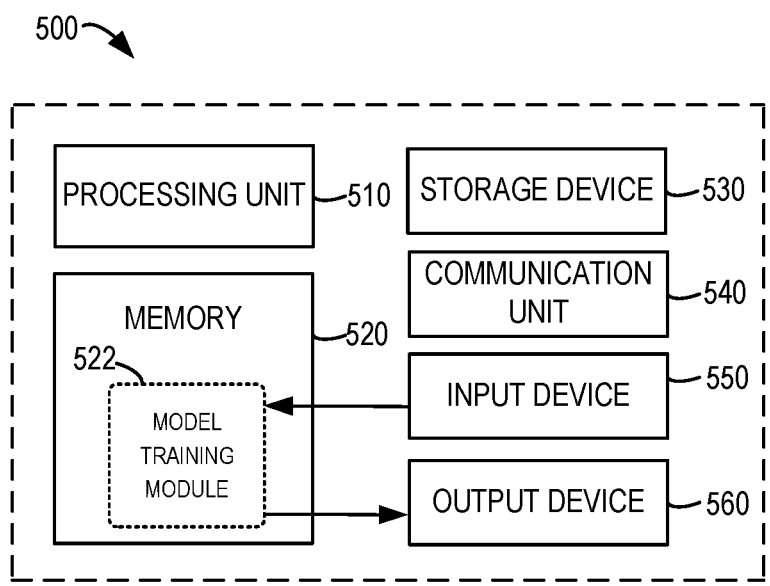
FIG. 5 illustrates a block diagram of an electronic device that can implement a plurality of implementations of the subject matter described herein.

FIG. 5 illustrates a block diagram of an electronic device 500 that can carry out a plurality of implementations of the subject matter. It would be appreciated that the electronic device 500 as shown in FIG. 5 is provided merely as an example, which cannot constitute any limitation to the functionalities and scope of the subject matter as described herein. For example, the model training device 120 shown in FIGS. 1 and 2 may be implemented by the electronic device 500. As shown, the electronic device 500 includes an electronic device 500 in the form of general computing device. The components of the electronic device 500 may include, but are not limited to, one or more processors or processing units 510, a memory 520, a storage device 530, one or more communication units 540, one or more input devices 550 and one or more output devices 560.

In some implementations, the computing device 500 can be implemented as various user terminals or service terminals. The service terminal may be any server, large-scale computing device, and the like, as provided by various service providers. The user terminal, for example, may be any type of mobile terminal, fixed terminal or portable terminal, such as mobile telephone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device or any combinations thereof, including accessories and peripherals of these devices or any combinations thereof. It would be anticipated that the electronic device 500 can support any type of interface for a user (such as a "wearable" circuit).

The processing unit 510 may be any physical or virtual processor and can perform various processing based on programs stored in the memory 520. In a multi-processor system, multiple processing units execute computer-executable instructions in parallel to improve the parallel processing capacity of the electronic device 500. The processing unit 510 can also be referred to as a central processing unit (CPU), microprocessor, controller or microcontroller.

The electronic device 500 typically includes a plurality of computer storage media, which may be any available media accessible by the electronic device 500, including, but not limited to, volatile and non-volatile media, and removable and non-removable media. The memory 520 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof.

The storage device 530 may be any removable or non-removable medium, and may include a machine-readable medium, such as a flash drive, disk or any other medium, which can be used for storing information and/or data and accessed in the electronic device 500. The computing electronic device 500 may further include additional removable/non-removable, volatile/non-volatile memory media. Although not shown in FIG. 5, a disk drive may be provided for reading or writing a removable and non-volatile disk and a disc drive may be provided for reading or writing a removable non-volatile disc. In these cases, each drive may be connected to the bus (not shown) via one or more data medium interfaces.

The communication unit 540 communicates with a further computing device via communication media. In addition, functionalities of components in the electronic device 500 can be implemented by a single computing cluster or multiple computing machines connected communicatively for communication. Therefore, the electronic device 500 can be operated in a networking environment using a logical link with one or more other servers, network personal computers (PCs) or another general network node.

The input device 550 may include one or more input devices, such as a mouse, keyboard, tracking ball, voice-input device, and the like. The output device 560 may include one or more output devices, such as a display, loudspeaker, printer and the like. As required, the electronic device 500 can also communicate via the communication unit 540 with one or more external devices (not shown) such as a storage device, display device and the like, one or more devices that enable users to interact with the electronic device 500, or any devices that enable the electronic device 500 to communicate with one or more other computing devices (for example, a network card, modem, and the like). Such communication can be performed via an input/output (I/O) interface (not shown).

In some implementations, besides integrated on a single device, some or all components in the electronic device 500 can be provided in the form of cloud computing architecture. In the cloud computing architecture, these components can be arranged remotely, and can operate together to implement the functionalities described herein. In some implementations, the cloud computing provides computing, software, data access and storage services, without a necessity of letting terminal users know the physical location or configuration of the system or hardware that provides these services. In various implementations, the cloud computing provides services via a wide area network (for example, Internet) using an appropriate protocol. For example, a cloud computing provider provides applications via a wide area network, and they are accessible via a web browser or any other computing component. Software or components and respective data of the cloud computing architecture can be stored on a server at a remote location. Computing resources in a cloud computing environment can be merged at a remote data center location or can be dispersed. Cloud computing infrastructures can provide services through a shared data center even though they are presented as a single access point for users. Hence, the cloud computing architecture can be used to provide components and functionalities as described herein from the service provider at the remote location. Alternatively, they may be provided from regular servers, or they may be mounted on a client device directly or in other manners.

The electronic device 500 may be used to implement video encoding in multiple implementations of the subject matter as described herein. The memory 520 may include a model training module 522 having one or more program instructions, which can be accessed and operated by the processing unit 510 to implement functionalities of various implementations as described herein.

Some example implementations of the subject matter described herein are listed below.

In a first aspect, the subject matter described herein provides a computer-implemented method. The method comprises: obtaining a Text to Speech (TTS) model and an Automatic Speech Recognition (ASR) model supporting at least one language; adjusting, based on a first set of paired data in a target language, the TTS model and the ASR model to support the target language, wherein the first set of paired data comprises speech data in the target language from multiple speakers and corresponding text data; and optimizing the TTS model based on the first set of paired data and a first set of synthesized paired data in the target language while optimizing the ASR model based on the first set of paired data and a second set of synthesized paired data in the target language, wherein the first set of synthesized paired data comprises a first set of speech data from multiple speakers and a first set of text data generated by the ASR model based on the first set of speech data, and the second set of synthesized paired data comprises a second set of text data and a second set of speech data of multiple speakers generated by the TTS model based on the second set of text data.

In some implementations, obtaining the TTS model and the ASR model comprises: training, based on a second set of paired data in the at least one language, the TTS model and the ASR model, wherein the second set of paired data comprises speech data in the at least one language from multiple speakers and corresponding text data.

In some implementations, the method further comprises: training a target TTS model and a target ASR model based on the first set of paired data and a plurality of sets of synthesized paired data in the target language generated by the optimized TTS model and the optimized ASR model.

In some implementations, training the target TTS model comprises: obtaining, from the first set of paired data, a third set of paired data associated with a target speaker in the plurality of speakers, wherein the third set of paired data comprises speech data in the target language from the target speaker and corresponding text data; generating, using the optimized TTS model, a third set of synthesized paired data in the target language, wherein the third set of synthesized paired data comprises a third set of text data and a third set of speech data of the target speaker generated by the optimized TTS model based on the third set of text data; and training the target TTS model based on the third set of paired data and the third set of synthesized paired data, such that the target TTS model can generate, based on text data in the target language, speech data of the target speaker corresponding to the text data.

In some implementations, training the target TTS model based on the third set of paired data and the third set of synthesized paired data comprises: obtaining a fourth set of synthesized paired data by removing unqualified speech data from the third set of speech data and removing text data corresponding to the unqualified speech data from the third set of text data; and training the target TTS model based on the third set of paired data and the fourth set of synthesized paired data.

In some implementations, the unqualified speech data comprises at least one of: speech data with missing words; speech data with repeated words; and incomprehensible speech data.

In some implementations, removing the unqualified speech data comprises: removing, from the third set of speech data, speech data with a Word Coverage Rate (WCR) lower than a predetermined threshold, wherein the WCR is inversely correlated with a possibility that missing words or repeated words exist in the speech data.

In some implementations, removing the unqualified speech data comprises: removing, from the third set of speech data, speech data with an Attention Diagonal Ratio (ADR) lower than a predetermined threshold, wherein the ADR indicates an alignment degree between the speech data and text data used to generate the speech data in the third set of text data.

In some implementations, training the target ASR model comprises: generating, using the optimized TTS model, a fifth set of synthesized paired data in the target language, wherein the fifth set of synthesized paired data comprises a third set of text data and a fourth set of speech data of multiple speakers generated by the optimized TTS model based on the third set of text data; generating, using the optimized ASR model, a sixth set of synthesized paired data in the target language, wherein the sixth set of synthesized paired data comprises a fifth set of speech data from multiple speakers and a fourth set of text data generated by the optimized ASR model based on the fifth set of speech data; and training the target ASR model based on the first set of paired data, the fifth set of synthesized paired data and the sixth set of synthesized paired data, such that the target ASR model can generate, based on speech data in the target language from multiple speakers, text data corresponding to the speech data.

In some implementations, the target language is different from the at least one language.

In a second aspect, the subject matter described herein provides an electronic device. The electronic device comprises: a processing unit; and a memory coupled to the processing unit and having instructions stored thereon, the instructions when executed by the processing unit causing the electronic device to perform acts comprising: obtaining a Text to Speech (TTS) model and an Automatic Speech Recognition (ASR) model supporting at least one language; adjusting, based on a first set of paired data in a target language, the TTS model and the ASR model to support the target language, wherein the first set of paired data comprises speech data in the target language from multiple speakers and corresponding text data; and optimizing the TTS model based on the first set of paired data and a first set of synthesized paired data in the target language while optimizing the ASR model based on the first set of paired data and a second set of synthesized paired data in the target language, wherein the first set of synthesized paired data comprises a first set of speech data from multiple speakers and a first set of text data generated by the ASR model based on the first set of speech data, and the second set of synthesized paired data comprises a second set of text data and a second set of speech data of multiple speakers generated by the TTS model based on the second set of text data.

In some implementations, obtaining the TTS model and the ASR model comprises: training, based on a second set of paired data in the at least one language, the TTS model and the ASR model, wherein the second set of paired data comprises speech data in the at least one language from multiple speakers and corresponding text data.

In some implementations, the acts further comprise: training a target TTS model and a target ASR model based on the first set of paired data and a plurality of sets of synthesized paired data in the target language generated by the optimized TTS model and the optimized ASR model.

In some implementations, training the target TTS model comprises: obtaining, from the first set of paired data, a third set of paired data associated with a target speaker in the plurality of speakers, wherein the third set of paired data comprises speech data in the target language from the target speaker and corresponding text data; generating, using the optimized TTS model, a third set of synthesized paired data in the target language, wherein the third set of synthesized paired data comprises a third set of text data and a third set of speech data of the target speaker generated by the optimized TTS model based on the third set of text data; and training the target TTS model based on the third set of paired data and the third set of synthesized paired data, such that the target TTS model can generate, based on text data in the target language, speech data of the target speaker corresponding to the text data.

In some implementations, training the target TTS model based on the third set of paired data and the third set of synthesized paired data comprises: obtaining a fourth set of synthesized paired data by removing unqualified speech data from the third set of speech data and removing text data corresponding to the unqualified speech data from the third set of text data; and training the target TTS model based on the third set of paired data and the fourth set of synthesized paired data.

In some implementations, the unqualified speech data comprises at least one of: speech data with missing words; speech data with repeated words; and incomprehensible speech data.

In some implementations, removing the unqualified speech data comprises: removing, from the third set of speech data, speech data with a Word Coverage Rate (WCR) lower than a predetermined threshold, wherein the WCR is inversely correlated with a possibility that missing words or repeated words exist in the speech data.

In some implementations, removing the unqualified speech data comprises: removing, from the third set of speech data, speech data with an Attention Diagonal Ratio (ADR) lower than a predetermined threshold, wherein the ADR indicates an alignment degree between the speech data and text data used to generate the speech data in the third set of text data.

In some implementations, training the target ASR model comprises: generating, using the optimized TTS model, a fifth set of synthesized paired data in the target language, wherein the fifth set of synthesized paired data comprises a third set of text data and a fourth set of speech data of multiple speakers generated by the optimized TTS model based on the third set of text data; generating, using the optimized ASR model, a sixth set of synthesized paired data in the target language, wherein the sixth set of synthesized paired data comprises a fifth set of speech data from multiple speakers and a fourth set of text data generated by the optimized ASR model based on the fifth set of speech data; and training the target ASR model based on the first set of paired data, the fifth set of synthesized paired data and the sixth set of synthesized paired data, such that the target ASR model can generate, based on speech data in the target language from multiple speakers, text data corresponding to the speech data.

In some implementations, the target language is different from the at least one language.

In a third aspect, the subject matter described herein provides a computer program product stored tangibly in a computer storage medium and including machine-executable instructions which, when executed by a device, cause the device to perform the method according to the above first aspect.

In the fourth aspect, the subject matter described herein provides a computer-readable medium having machine-executable instructions stored thereon, the machine-executable instructions, when executed by the device, causing the device to perform the method according to the above first aspect.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter as described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
    training a Text to Speech (TTS) model and an Automatic Speech Recognition (ASR) model using paired speech and text data in a first language to develop speech-text alignment capabilities;
    adjusting the trained TTS model and the ASR model to support a target language different from the first language by initializing the models for the target language using pre-trained parameters from the first language while updating phoneme embeddings, character embeddings and speaker embeddings for the target language, wherein the adjusting is based on a first set of paired data comprising speech data in the target language from multiple speakers and corresponding text data; and
    optimizing the TTS model based on the first set of paired data and a first set of synthesized paired data in the target language while optimizing the ASR model based on the first set of paired data and a second set of synthesized paired data in the target language, wherein the first set of synthesized paired data comprises a first set of speech data from multiple speakers and a first set of text data generated by the ASR model based on the first set of speech data, and the second set of synthesized paired data comprises a second set of text data and a second set of speech data of multiple speakers generated by the TTS model based on the second set of text data.

2. The method of claim 1, wherein training the TTS model and the ASR model comprises:
    training, based on a second set of paired data in the first language, the TTS model and the ASR model, wherein the second set of paired data comprises speech data in the first language from multiple speakers and corresponding text data.

3. The method of claim 1, further comprising:
    training a target TTS model and a target ASR model based on the first set of paired data and a plurality of sets of synthesized paired data in the target language generated by the optimized TTS model and the optimized ASR model.

4. The method of claim 3, wherein training the target TTS model comprises:
    obtaining, from the first set of paired data, a third set of paired data associated with a target speaker in a plurality of speakers, wherein the third set of paired data comprises speech data in the target language from the target speaker and corresponding text data;
    generating, using the optimized TTS model, a third set of synthesized paired data in the target language, wherein the third set of synthesized paired data comprises a third set of text data and a third set of speech data of the target speaker generated by the optimized TTS model based on the third set of text data; and
    training the target TTS model based on the third set of paired data and the third set of synthesized paired data, such that the target TTS model can generate, based on text data in the target language, speech data of the target speaker corresponding to the text data.

5. The method of claim 4, wherein training the target TTS model based on the third set of paired data and the third set of synthesized paired data comprises:
    obtaining a fourth set of synthesized paired data by removing unqualified speech data from the third set of speech data and removing text data corresponding to the unqualified speech data from the third set of text data; and
    training the target TTS model based on the third set of paired data and the fourth set of synthesized paired data.

6. The method of claim 5, wherein the unqualified speech data comprises at least one of:
    speech data with missing words;
    speech data with repeated words; and
    incomprehensible speech data.

7. The method of claim 5, wherein removing the unqualified speech data comprises:
    removing, from the third set of speech data, speech data with a Word Coverage Rate (WCR) lower than a predetermined threshold, wherein the WCR is inversely correlated with a possibility that missing words or repeated words exist in the speech data.

8. The method of claim 5, wherein removing the unqualified speech data comprises:
    removing, from the third set of speech data, speech data with an Attention Diagonal Ratio (ADR) lower than a predetermined threshold, wherein the ADR indicates an alignment degree between the speech data and text data used to generate the speech data in the third set of text data.

9. The method of claim 3, wherein training the target ASR model comprises:
    generating, using the optimized TTS model, a fifth set of synthesized paired data in the target language, wherein the fifth set of synthesized paired data comprises a third set of text data and a fourth set of speech data of multiple speakers generated by the optimized TTS model based on the third set of text data;

generating, using the optimized ASR model, a sixth set of synthesized paired data in the target language, wherein the sixth set of synthesized paired data comprises a fifth set of speech data from multiple speakers and a fourth set of text data generated by the optimized ASR model based on the fifth set of speech data; and training the target ASR model based on the first set of paired data, the fifth set of synthesized paired data and the sixth set of synthesized paired data, such that the target ASR model can generate, based on speech data in the target language from multiple speakers, text data corresponding to the speech data.

10. An electronic device, comprising:

a processing unit; and a memory coupled to the processing unit and having instructions stored thereon, the instructions when executed by the processing unit causing the electronic device to perform acts comprising:

training a Text to Speech (TTS) model and an Automatic Speech Recognition (ASR) model using paired speech and text data in a first language to develop speech-text alignment capabilities;

adjusting the trained TTS model and the ASR model to support a target language different from the first language by initializing the models for the target language using pre-trained parameters from the first language while updating phoneme embeddings, character embeddings and speaker embeddings for the target language, wherein the adjusting is based on a first set of paired data comprising speech data in the target language from multiple speakers and corresponding text data; and optimizing the TTS model based on the first set of paired data and a first set of synthesized paired data in the target language while optimizing the ASR model based on the first set of paired data and a second set of synthesized paired data in the target language, wherein the first set of synthesized paired data comprises a first set of speech data from multiple speakers and a first set of text data generated by the ASR model based on the first set of speech data, and the second set of synthesized paired data comprises a second set of text data and a second set of speech data of multiple speakers generated by the TTS model based on the second set of text data.

11. The electronic device of claim 10, wherein training the TTS model and the ASR model comprises:

training, based on a second set of paired data in the first language, the TTS model and the ASR model, wherein the second set of paired data comprises speech data in the first language from multiple speakers and corresponding text data.

12. The electronic device of claim 10, wherein the acts further comprise:

training a target TTS model and a target ASR model based on the first set of paired data and a plurality of sets of synthesized paired data in the target language generated by the optimized TTS model and the optimized ASR model.

13. A computer program product stored tangibly in a computer storage medium and including machine-executable instructions which, when executed by a device, cause the device to perform acts comprising:

training a Text to Speech (TTS) model and an Automatic Speech Recognition (ASR) model using paired speech and text data in a first language to develop speech-text alignment capabilities;

adjusting the trained TTS model and the ASR model to support a target language different from the first language by initializing the models for the target language using pre-trained parameters from the first language while updating phoneme embeddings, character embeddings and speaker embeddings for the target language, wherein the adjusting is based on a first set of paired data comprising speech data in the target language from multiple speakers and corresponding text data; and optimizing the TTS model based on the first set of paired data and a first set of synthesized paired data in the target language while optimizing the ASR model based on the first set of paired data and a second set of synthesized paired data in the target language, wherein the first set of synthesized paired data comprises a first set of speech data from multiple speakers and a first set of text data generated by the ASR model based on the first set of speech data, and the second set of synthesized paired data comprises a second set of text data and a second set of speech data of multiple speakers generated by the TTS model based on the second set of text data.

* * * * *